Sept. 15, 1964
F. W. R. STARP
3,148,603
PHOTOGRAPHIC CAMERA WITH BUILT-IN EXPOSURE METER
Filed April 19, 1963
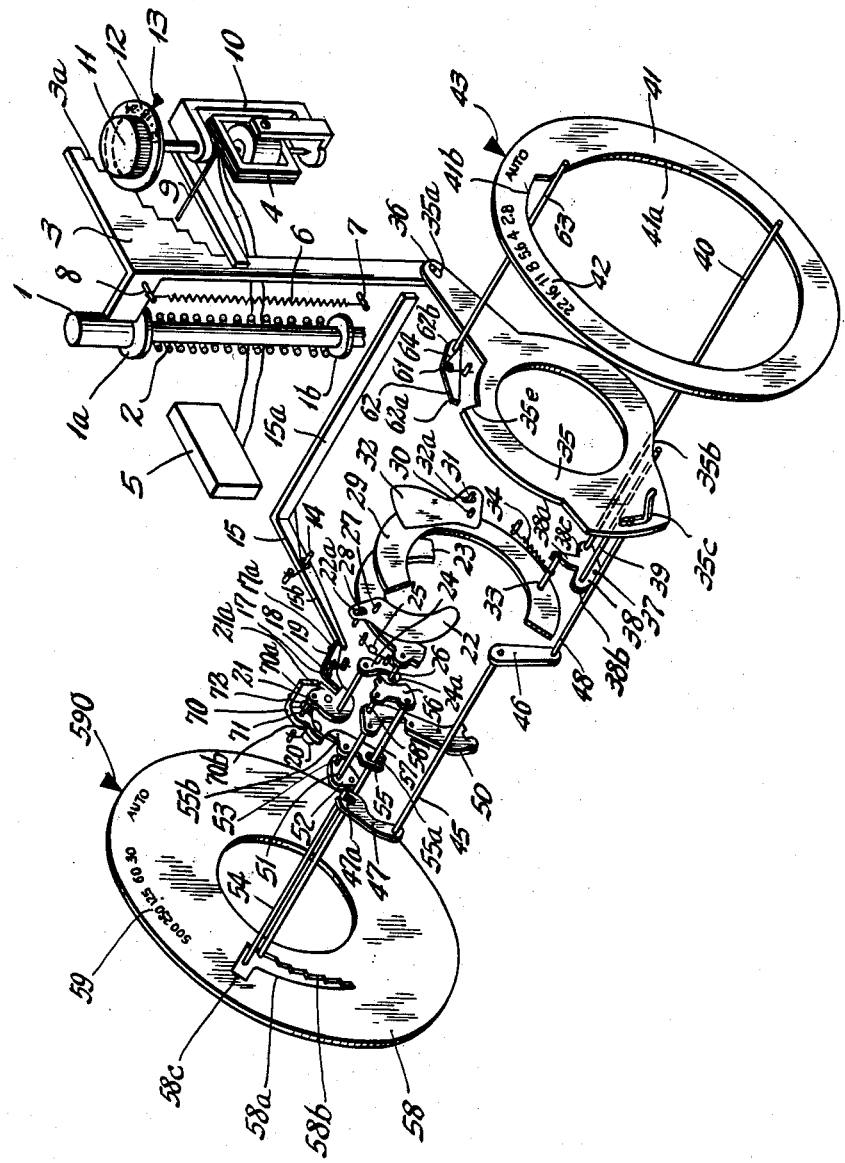
INVENTOR.
Franz W. R. Starp
BY
Arthur A. March
ATTORNEY

United States Patent Office 3,148,603
Patented Sept. 15, 1964

3,148,603
PHOTOGRAPHIC CAMERA WITH BUILT-IN
EXPOSURE METER
Franz W. R. Starp, Calmbach (Enz), Germany, assignor to Alfred Gauthier, G.m.b.H., Calmbach (Enz), Germany, a corporation of Germany
Filed Apr. 19, 1963, Ser. No. 274,081
Claims priority, application Germany Apr. 21, 1962
2 Claims. (Cl. 95—10)

This invention relates to a photographic camera having a built-in exposure meter and means linked thereto to control the exposure parameters, that is, the diaphragm aperture size and the duration of exposure, or shutter speed. In particular, the invention relates to means for releasing part of the linkage immediately after an exposure is made.

In cameras, having variable shutter speeds, a speed escapement is generally provided, together with a mechanism for slowing down the operation of the escapement, in order to obtain longer exposure times. In such cameras, after the escapement mechanism has run down, it is retained in its run-down position until the shutter is re-cocked, which frequently is accomplished by the film winding mechanism but may be accomplished in other ways. In cameras having not only variable shutter speed mechanisms, but also built-in exposure meters, which are so connected as to control the exposure parameters, the linkage between the exposure meter and other components of the shutter may include a movable pointer or member, the position of which is controlled at least partially by the illumination on the scene to be photographed. The position of this member is sensed by a sensing member, which clamps the movable member and retains it until the exposure is completed and the shutter re-cocked. The clamping places strains on the mechanism of the exposure meter and should be avoided in order to minimize deformations of the mechanism.

One of the objects of the present invention is to avoid deformation of the mechanism of the exposure meter, by releasing this mechanism, as soon as possible, after the exposure is made.

In accordance with the present invention, an additional driving member is provided between the shutter speed escapement mechanism and the linkage that directly operates the shutter. This driving member is arranged to allow the shutter speed escapement mechanism to return to its starting position, without waiting for the shutter to be re-cocked. In this way, the pressure on the sensitive components of the exposure meter is limited to a minimum time and thus reduces the potential for damaging this sensitive mechanism. In addition, releasing the exposure meter mechanism permits it to respond to fluctuations in the light so that the photographer can obtain information about a possible subsequent photographic exposure without having to re-cock the shutter and thereby place the camera in condition for a possible accidental exposure.

The driving mechanism includes a pawl which is articulately mounted on one member of the shutter operating linkage and bears against part of the escapement mechanism so that the pawl drives the latter part in one direction of motion, while it slides freely past this part in the opposite direction of motion.

This invention will be described in greater detail in the following specification in conjunction with the drawing which shows a perspective axially expanded view of one embodiment of the invention.

In the drawing, a shutter release trigger 1 is conventionally mounted in a camera (not shown) and is biased upwardly by a compression spring 2 and is provided with a flange 1a that engages a projection extending from a sensing member 3. This sensing member has a stepped cam surface 3a on its lower side to cooperate with a moving element 4 of an exposure meter each time the sensing member moves downwardly when the trigger 1 is depressed to take a photograph. The position of the moving element 4 is controlled by means of a photocell 5 in response to the illumination of the scene to be photographed.

In order to cause the sensing member 3 to move downwardly when the trigger 1 is depressed, a tension spring 6 is stretched between a pin 7, which is fixed with respect to the body of the camera, and a pin 8 located on the sensing member itself. The moving element 4 has a movable member or pointer, 9 rigidly attached to it and is pivotally mounted within a frame 10, which itself is pivotally mounted and may be turned by means of a knob 11. This knob has a film sensitivity scale 12 which is set by reference to a fixed mark 13 that indicates the position to which the knob 11, and hence the frame 10, must be rotated to adjust the operation of the exposure meter to the speed of the film being used in the camera.

A second flange 1b is located on the lower portion of the trigger 1 to engage an arm 15a of a lever 15 when the trigger is depressed. This lever is pivotally mounted on a pin 14 and has a second arm 15b that operates an arresting lever 17. The latter lever is pivotally mounted on a pin 18 and provided with a lug 17a which is bent at one end to extend into the path of movement of the arm 15b. The lug 17a is held in contact with the arm 15b by a spring 19, and as the lever 15 moves clockwise, the lever 17 is pivoted counter-clockwise. The other end of the lever 17 fits into a notch on a disc 21 to hold the disc in place against the pressure of a spring 20, which provides the force to rotate the disc counterclockwise as soon as the lever 17 is pivoted out of the way. This rotation of the disc initiates the operation of an escapement mechanism which controls the shutter of the camera, as will be described hereinafter.

The shutter comprises a plurality of blades 22, only one of which is shown in the drawing. These blades are pivotally mounted on an actuating ring 23, which is connected to the disc 21 by a pawl 24 articulately connected to the disc. A spring 25 presses the pawl 24 in the clockwise direction to hold the jaws 24a of the pawl in engagement with a pin 26 on the ring 23, with the result that the ring 23 is rotated first in one direction and then in the other by means of the jaws 24a as rotation of the disc 21 causes the pawl to reciprocate back and forth. The individual shutter blades 22 are pivotally attached to pins 27 spaced around the ring 23 and are provided with slots 22a that engage individual fixed pins 28. This pin and slot engagement between the blades 22 and the pins 28 causes the blades to swing back and forth so as to open and close the shutter as the actuating ring moves back and forth under the control of the pawl 24 and ultimately under the control of the disc 21.

Also arranged in the shutter housing coaxially with the shutter actuating ring 23 is a second ring 29 that controls the diaphragm aperture. The latter ring has a plurality of pins 30, only one of which is shown in the drawing, on each of which a diaphragm lamella 32 is pivotally mounted. For each of the pins 30, there is a corresponding fixed pin 31, which fits into a slot 32a of one of the diaphragm lamellae so that, as the ring 29 rotates, the diaphragm lamellae 32 are pivoted inward to reduce the size of the aperture. A driving pin 33 is also attached to the ring 29 and a spring 34 is connected to the driving pin to cause the ring 29 normally to assume the position shown in the drawing, in which the diaphragm lamellae 32 are in the position of the maximum aperture.

In order to take photographs with automatic control of both the shutter speed and the diaphragm aperture, a program setting ring 35 is mounted so as to be coaxial with the rings 23 and 29. The ring 35 has an arm with a slot 35a which engages a pin 36 on the lower extremity of the sensing member 3 to cause the ring 35 to be rotated by the sensing member 3 as the latter moves downwardly when a picture is being taken. The ring 35 also has one cam 35b on its perimeter to control the diaphragm setting ring 29 and a second cam 35c in the form of a slot, which controls the shutter escapement mechanism and thus the duration of each exposure.

The linkage from the cam 35b to the diaphragm control ring 29 comprises a three-armed lever 38 pivotally mounted on shaft 37. One arm 38a engages the pin 33 to move it and thereby to rotate the ring 29 when the lever 38 rotates. The other two arms 38b and 38c carry two cam follower pins 39 and 40 respectively, the first one of which engages the cam 35b and the other one of which engages a cam surface 41a on a diaphragm aperture control 41. This control is manually rotatable and has a scale 42, which, in cooperation with a fixed mark 43, indicates the size to which the diaphragm aperture is set within a range of manually set positions. In addition, the ring 41 has an automatic setting position indicated by the word "Auto," which is placed opposite the fixed mark 43, when it is desired to have the diaphragm aperture controlled automatically, in response to the amount of light received from the photocell 5. This is the position indicated in the drawing, and in this position the diaphragm lamellae 32 are under the control of the cam 35b on the setting ring 35, instead of the cam 41a on the control 41.

When the exposure parameters are to be automatically controlled, both the diaphragm aperture and the shutter speed are determined by the intensity of light reaching the photocell 5. In order to control the shutter speed a linkage is provided that includes a pivotally mounted shaft 45 with one lever 46 at one end and another lever 47 at the other. The lever 46 has a pin 48 extending from its free end to engage the slot cam 35c on the program setting ring 35. The lever 47 is operatively connected to a shutter speed escapement mechanism that controls the length of time required to move the shutter blades 22 from their closed positions to their open positions and back to their closed positions.

The shutter speed escapement mechanism includes a carrier plate 50, having a pin 51 thereon, that serves as a pivot pin for a lever 52. At one end of the lever 52 is a pin 53 and at the other end a pin 54. The pin 53 forms an axis of rotation for an actuating member, or braking lever, 55, while the pin 54 is linked to the lever 47 by means of a slot 47a. A driving segment 56, which is part of the escapement mechanism and which may be provided with a toothed surface to engage other gears (not shown) of the escapement mechanism, is pivotally positioned on a pin 561 on the carrier plate 50 and is spring biased to keep it in the starting position shown. In this position, a pin 57 extending from the segment 56 rests against the carrier plate 50. This pin extends through a slotted opening 55a in the actuating member 55 and into the region of a cam surface 58b on a shutter speed setting control 58.

In order to be able to set the shutter speed escapement mechanism 50–56 for either automatic operation under the control of the program setting ring 35 or for manual operation under the control of the shutter speed control 58, the latter ring is provided with a scale 59 that indicates the manual setting range of shutter speeds and with an automatic position indicated by the word "Auto." These setting positions are placed opposite a fixed mark 590, which indicates whether the shutter speed is automatically controlled or manually controlled, and if the latter, at what shutter speed it is to operate. For manual setting of the shutter speed, the cam 58b is engaged by the pin 57 so that manual rotation of the control 58 causes the pin to move radially with respect to the axis of the control ring 58 as the pin follows the cam 58b. In addition to the cam 58b, a control edge 58a, which is concentric with the axis of the control 58, is provided. The length of the edge 58a corresponds to the range of the scale 59 and the purpose of this control edge is to secure the lever 52 and the linkage members 45 to 48 against undesirable play when the driving segment 56 and the actuating member 55 are set by means of the shutter speed control 58. In order to eliminate the influence of the control edge 58a when the control 58 is set to its "Auto" position, the control edge 58a is provided with an opening 58c, which is associated with the "Auto" setting position to permit the necessary freedom of motion to the pin 57.

There is also associated with the program setting ring 35 an arresting lever 62 which is positioned on a pin 61 and the object of which consists in retaining both the ring 35 and the sensing member 3 in their respective starting positions—when the diaphragm control 41 is set to its manually controlled range of positions. This prevents the ring 35 from operating either the diaphragm actuating ring 29 or the shutter speed escapement mechanism 50 to 56. One arm 62a of the lever 62 cooperates with a projection 35e of the program setting ring 35 while its other arm 62b is provided with a pin 63 that engages the inner circumference of the diaphragm control 41 due to the action of a spring 64. When the control 41 is in its "Auto" setting position, the pin 63 is opposite the peak of the cam 41a, which retains the arresting lever 62 in the inoperative position as is shown in the drawing. But if the setting ring 41 is set at the manually controlled range of the diaphragm scale 42, the pin 63 moves into the radially outward circumferential section 41b of the ring 41. The resulting pivoting motion of the lever 62 moves its arm 62a into the path of motion of the projection 35e of the program setting ring 35, locking this ring against clockwise motion. The diaphragm lamellae 32 must now be controlled by the cam 41a of the setting ring 41, which is connected to the diaphragm actuating ring 29 by way of the follower pin 40 and the lever 38. As has already been mentioned, the different shutter speeds are obtained by means of the escapement mechanism 50 to 56 by setting the actuating member 55 at different relative positions with respect to the driving member 21 of the camera shutter. This relative setting is effected either manually with the aid of the cam 58b of the shutter 58, or, in the case of automatic shutter speed setting, by means of the cam 35c of the program setting ring 35. Depending on the shutter speed, the driving member 21, when rotating, engages the actuating member 55 for a longer or shorter time, thereby causing the member to pivot clockwise about the pin 53 until the actuating member finally reaches its end position.

In previous escapement mechanisms, the actuating member is retained in this end position by the driving member and is released again only by the cocking of the driving member whereupon the actuating member returns to its starting position under the force of a restoring or readjusting spring. As long as the exposure time setting is effected manually by means of the cam 58b, this fact is of no importance. But it is a different matter when the setting of the actuating member 55 is determined by the position of the needle 9 of the exposure meter, which position is sensed by the sensing member 3. The latter, in turn, transmits to the actuating member 55 by way of a linkage which includes the program setting ring 35, as well as the members 45 to 48 and 52, the sensed position of the needle 9 each time that the camera release member is actuated. The retaining of the actuating member 55 in its end position has the effect that the sensing member 3 also remains in engagement with the exposure meter needle 9 and releases it only when the braking lever is able to return again from its end position to its starting position. In prior escapement mechanisms, this is achieved, as already mentioned, only upon recocking of the camera shutter, which may sometimes be done only after a very long time. In view of the forces to which the exposure meter is subjected, when the camera shutter is uncocked it would be much more advantageous if the clamping of the needle were limited to the time required for the exposure setting.

According to the invention, this object is achieved by placing, between the driving member 21 and the actuating member 55 of the exposure-time escapement mechanism 50 to 56, a driver which operates the actuating member when the driving member 21 is rotating counterclockwise during the taking of a photograph and which, immediately after this rotation of the driving member has been completed, releases the actuating member, so that the latter as well as the members of the sensing and transmission linkage connected thereto are able to return again to their starting positions shown in the drawing. In the present embodiment, the driver for the actuating member 55 is a pawl 70, which is pivotally supported on a pin 71 that extends from the driving member 21. The pawl has a rectangularly bent-off arm 70a, which engages, due to the pressure of a spring 72, a projection 21a of the driving member 21, which causes the pawl to rotate when the driving member rotates counterclockwise. The other arm 70b of the pawl cooperates with an extension 55b of the actuating member 55 that, during this counterclockwise rotation of the driving member 21, the arm 70b impinges on the extension 55b of the actuating member and moves the latter from its starting position to an end position. The starting position of the actuating member 55 is determined either by the cam 58b of the shutter speed control 58 or by the cam 35c of the program setting ring 35. Since the pawl 70 and actuating member 55 pivot about different axes, their arcuate paths move apart toward the end of the rotation of the driving member 21, i.e. during the closing motion of the shutter blades 22. As a result the actuating member 55 is removed from contact with the pawl 70, as well as from control by the driving member 21, and is, therefore, able to return to its starting position completely independently of the recocking of the camera shutter.

During the clockwise cocking motion of the driving member 21, the arm 70b of the driving pawl 70 also impinges on the extension 55b of the actuating member 55, which is now in its starting position. However, since the pawl is only being pulled by the spring 72 and not pushed by the unyielding projection 21a during this reverse rotation, the pawl is able to slide past the extension 55a. Once the driving member is in cocked position, the pawl 70 is again behind the extension and is in position to drive the actuating member 55 during the next photographic exposure.

The mode of operation of the camera according to the invention is the following:

In the accompanying drawing, the camera is set at its automatic exposure setting so that the shutter speed and diaphragm aperture are determined by the light intensity and by the film sensitivity set, according to a predetermined shutter/diaphragm program, for which purpose the shutter speed control 58 and the diaphragm control 41 are moved into their "Auto" setting positions. When these controls are so placed, the arresting lever 62 is outside the path of motion of the program setting ring 35. Moreover, the cam 41a of the diaphragm setting ring 41 occupies a position such that it no longer influences the pin 40, which leaves the lever 38 to be controlled by means of its pin 39 following the cam 35b of the program setting ring 35. In addition, the connection between the cam 58b of the shutter speed control 58 and the escapement mechanism 50 to 56 is interrupted because, in the "Auto" position of the control 58, the opening 58c is opposite the pin 57 and this leaves the pin free to move outward.

If the camera is set in this manner and the trigger 1 is depressed for the purpose of taking a photograph, the sensing member 3 follows this motion due to the action of its spring 6 until one of its steps 3a impinges on the needle 9 of the movable measuring-mechanism member 4. In response to this motion of the sensing member, the program setting ring 35 is simultaneously rotated clockwise to an extent determined by the extent of movement of the sensing member 3. This, in turn, has the effect that the pin 48 of the transmission linkage 45 to 48, which controls the escapement mechanism 50 to 56, slides along in the control slots 35c and sets the exposure time corresponding to the path traveled, by adjusting the lever 52 and, thereby, the actuating member 55.

When the program setting ring 35 rotates, the diaphragm setting cam 35b pivots the lever 38 in the counterclockwise direction by way of the pin 39. The lever 38, in turn, moves the diaphragm actuating ring 29 and the diaphragm lamellae 32 pivotally mounted on the ring 29 into a position corresponding to the angle through which the ring 35 is turned by the sensing member 3. This completes the automatic exposure setting according to a predetermined shutter/diaphragm program.

Upon further depression of the shutter release trigger 1, the flange 1b strikes the arm 15a of the release lever 15 and pivots the lever clockwise. This causes the arresting lever 17 to be removed from engagement with the driving member 21 of the shutter and releases this member so that it is free to rotate in response to the force of the spring 20.

Depending on the setting of the actuating member 55 of the escapement mechanism 50 to 56, this rotation of the driving member 21 causes the pawl 70 to pivot the actuating member 55 about its axis 53. After having traveled a distance which determines the length of time of exposure the actuating member 55 swings out of contact with the pawl 70. During this process, the shutter blade ring 23 articulately connected to the driving member 21 by way of the driving pawl 24 and the pin 26 is simultaneously rotated back and forth, whereby the shutter blades 22 swing out of the closing position (shown in the drawing) to their largest aperture width and subsequently return again to their closed position.

In order to effect exposures with manual setting of shutter speed and diaphragm aperture, it is merely necessary to rotate the controls 41 and 58 from their "Auto" setting positions to the right, until the desired diaphragm and shutter speed values of the scales 42 and 59 are opposite the fixed marks 43 and 590. Upon rotation of the diaphragm control 41, the cam 41a operates the lever 38 by pressure on the pin 40. As a result arm 38a rotates the diaphragm actuating ring 25, moving the latter into a position corresponding to the diaphragm aperture that has been set. Moreover, upon rotation of the shutter speed control 58, the actuating member 55 of the escapement mechanism is set, by means of the cam 58b. Furthermore, upon the above-mentioned setting of the diaphragm aperture control 41, the concentrically extending control edge 41b of the diaphragm control moves into position to be contacted by the pin 63, and as a result, the arresting lever 62 is pivoted in the counterclockwise direction due to the action of its spring 64. This causes both the program setting ring 35 and the sensing member 3 connected to the former to be locked in their starting positions.

If the camera release member 1 is depressed after the camera has been manually set in the above-described manner, the sensing member 3 remains in its starting position due to the locking of the program setting ring 35. The lever 15 releases, by way of the arresting lever 17, the driving member 21 which, in turn, actuates the shutter blade ring 23 by way of the pawl 24.

I claim:
1. A photographic camera comprising a built-in exposure meter including means for generating an electric current in response to light from a scene to be photographed, a movable member electrically connected to said means to be moved in response to said current; a shutter; a shutter trigger; means controlled by said trigger for operating said shutter, said last-named means comprising a driving member, an escapement mechanism, and an intermediate member connecting said driving member to an actuating member of said escapement mechanism when said shutter is operating to take a photograph; and a linkage connecting said movable member to said actuating member to control the speed of operation of said shutter, said linkage comprising a sensing member operated by said trigger and engaging said movable member, said intermediate member being pivotally mounted to permit relative movement between said driving member and said actuating member to disengage said escapement mechanism after said driving member has completed the motion required to open and to close said shutter.

2. A photographic camera comprising a built-in exposure meter including means for generating an electric current in response to light from a scene to be photographed, a movable member electrically connected to said means to be moved in response to said current; a shutter; a shutter trigger; means connecting said movable member to said shutter; an escapement mechanism for controlling said shutter, said escapement mechanism comprising an actuating member; a driving member and a pawl articulately supported on said driving member, one end of said pawl bearing against said driving member to be pushed thereby in one direction to engage and to operate said actuating member when said driving member moves in the direction to open and to close said shutter, said pawl pivoting and sliding past said actuating member when said driving member moves in the opposite direction.

References Cited in the file of this patent
UNITED STATES PATENTS

| | | |
|---|---|---|
| 3,095,791 | Richter | July 2, 1963 |
| 3,105,427 | Rentschler | Oct. 1, 1963 |